UNITED STATES PATENT OFFICE.

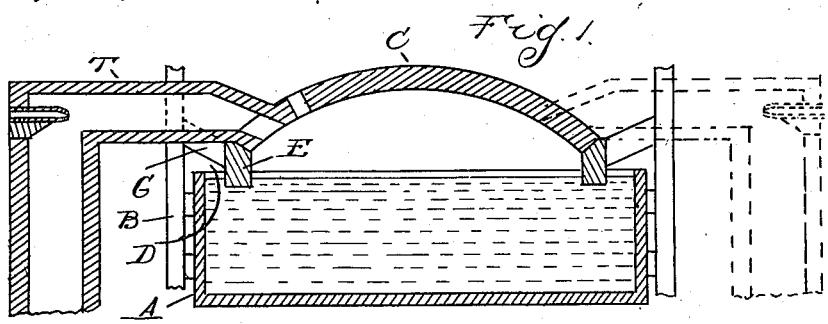
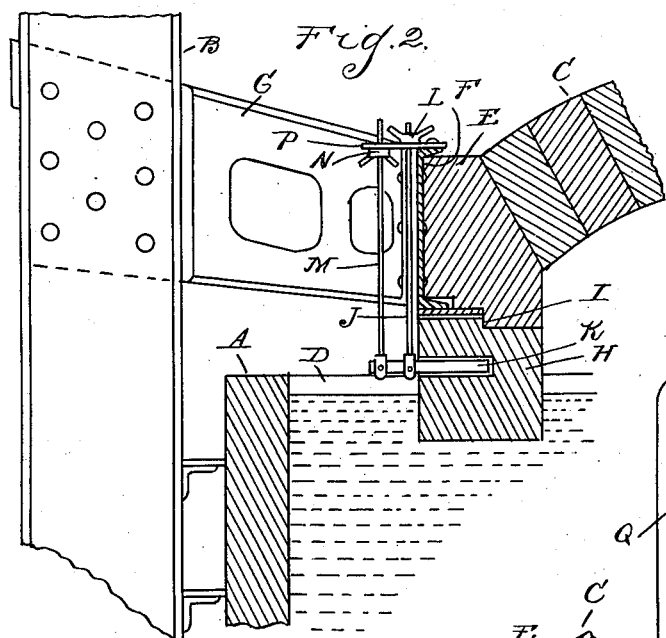
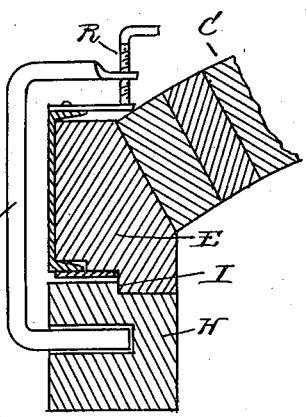
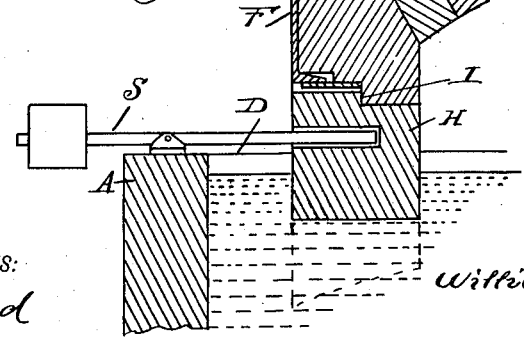

WILLIAM G. BERGMAN, OF TOLEDO, OHIO, ASSIGNOR TO THE TOLEDO GLASS COMPANY, OF TOLEDO, OHIO, A CORPORATION OF OHIO.

GLASS-TANK.

1,237,283.  Specification of Letters Patent.  Patented Aug. 21, 1917.

Application filed June 4, 1914. Serial No. 842,966.

*To all whom it may concern:*

Be it known that I, WILLIAM G. BERGMAN, a citizen of the United States of America, residing at Toledo, in the county of Lucas and State of Ohio, have invented certain new and useful Improvements in Glass-Tanks, of which the following is a specification, reference being had therein to the accompanying drawings.

The invention relates to glass melting tanks, and it is the object of the invention to obtain a practical construction of tank, in which a lining of chilled glass is maintained for protecting the walls from fluxing.

In the drawings:—

Figure 1 is a cross section through the tank;

Fig. 2 is an enlarged view, showing the manner of supporting the furnace cap and sealing means; and Figs. 3 and 4 show modified constructions of Fig. 2.

In the present state of the art, glass melting furnaces have been constructed in which the side walls of the tank are protected from the fluxing action by exposing a marginal portion of the glass to air cooling. This has the effect of producing a lining of chilled glass which protects the walls from the corrosive action of the flux. With furnaces of this type, however, considerable difficulty has been experienced in mechanical construction. Thus it is necessary to expose the marginal portion of the glass to the air in order that it may be chilled, while at the same time it is necessary to support the cap or portion of the furnace for closing the combustion chamber. One construction which has been tried is the suspension of the cap or furnace chamber from a superframe, but without satisfactory result. With the present invention the difficulty is overcome by the employment of an arch cap, and the supporting of the walls forming the base of the arch by laterally-projecting abutments, which may be anchored to the buckstays for holding the side walls of the tank.

In detail, A is the glass-holding tank which may be of usual construction, and B are the buckstays for holding the side walls of the tank. C is an arch-shaped cap arranged above the tank and so limited in dimensions as to leave an exposed glass margin D. For supporting this cap the blocks E which form the side walls are engaged with a supporting beam, such as the channel beam F, while the latter is supported by bracket abutments G projecting laterally from the buckstays B. The blocks E are suitably beveled to form the base of an arch constituting the main portion of the cap, and by reason of the fact that the brackets G are rigid this arch is held intact.

To retain the gases within the combustion chamber, the cap must be sealed by its side walls extending beneath the surface of the glass. These depending portions are thus the only portions of the furnace that will be exposed to the fluxing action, for the side walls of the tank will be protected by the chilled glass due to the margin exposed to air. The sealing portions will, however, waste away in time, and I have therefore provided means for easily removing and replacing the same. This may be accomplished by forming the sealing blocks H so as to form a break-joint I with the blocks E, and in supporting said blocks H by hangers from the beam F. As shown in Fig. 2, hangers J are formed by rods which at their lower ends are connected with laterally-projecting lever arms K, and at their upper ends are adjustably secured by nuts L engaging threaded portions of the rods. The block H is held at the proper angle by attaching a second rod M to the lever arm K, and which may be vertically adjusted by a nut N engaging a threaded portion and bearing against a strap P on the beam F. Thus by adjusting the rods J and M the position and angle of the block H may be changed.

With the construction shown in Fig. 3, the block H is supported by a yoke-shaped frame Q with an adjustable clamping screw R at its upper end. With the construction shown in Fig. 4, the block is supported by a counterweighted lever S fulcrumed upon the walls of the tank A. With each of these constructions whenever the block H becomes worn away by the flux, it may be quickly removed and another block substituted without the necessity of cooling off the furnace.

The gases for combustion may be introduced into the furnace chamber within the cap by any suitable means, such as the twyers T connecting with the arch above the base blocks E thereof.

What I claim as my invention is:—

1. In a glass furnace, the combination with a glass-holding tank, of a cap forming the combustion chamber of a lesser dimension than the tank to provide margins of the glass exposed to air, said cap comprising an arch portion and blocks forming abutments for said arch, a beam for supporting said blocks, and laterally-extending supports for said beam.

2. In a glass furnace, the combination with a glass-holding tank, of a combustion cap therefor comprising an arch portion, blocks forming the arch abutments, laterally-extending supports for said abutment blocks, and sealing blocks detachably connected to said abutment blocks and depending therefrom below the level of the glass.

3. In a glass furnace, the combination with a glass-holding tank, of a combustion cap therefor, comprising an arch portion, abutment blocks at the opposite sides thereof and arranged inside of the plane of the tank wall to expose a margin of the glass, longitudinally-extending beams for supporting said abutments, buckstays secured to the sides of said tank, laterally-projecting bracket arms upon said buckstays for supporting said beams, and sealing blocks detachably secured to said abutment blocks and depending therefrom below the level of the glass.

4. In a glass furnace, the combination with a tank, of a combustion cap having an arch portion, an abutment for said arch arranged in a plane inside of the wall of the tank to expose a margin of the glass, a beam extending longitudinally of said abutment, a support outside of the tank wall, and a bracket projecting laterally from said support and connected to said beam.

5. In a glass furnace, the combination with a tank, of a combustion cap having an arch portion and an abutment, the latter being arranged above the glass level in the tank and inside of the plane of the side wall of the tank to expose a margin of the glass, laterally-extending supporting arms for said abutment, and a sealing block detachably suspended from said abutment and depending beneath the level of the glass.

6. In a glass furnace, the combination with a combustion cap having an arch portion and a suspended abutment, of a beam for supporting said abutment, a sealing block beneath said abutment depending therefrom into the glass, a lever arm for supporting said sealing block, and adjustable compression and tension rods engaging said lever arm and attaching the same to said beam.

7. In a glass furnace, the combination with a tank, of a combustion cap therefor having an arch portion and an abutment, the latter being arranged within the plane of the side wall of the tank, a laterally-projecting supporting arm for said abutment, a sealing block having a stepped or break-joint engagment with said abutment depending therefrom to extend beneath the level of the glass, and means for detachably suspending said sealing block from said abutment.

In testimony whereof I affix my signature in presence of two witnesses.

WILLIAM G. BERGMAN.

Witnesses:
S. E. EICHMAN,
T. H. MILLER.